Sept. 20, 1949.   E. L. HARDER ET AL   2,482,482
CONTROL SYSTEM
Filed Feb. 1, 1946
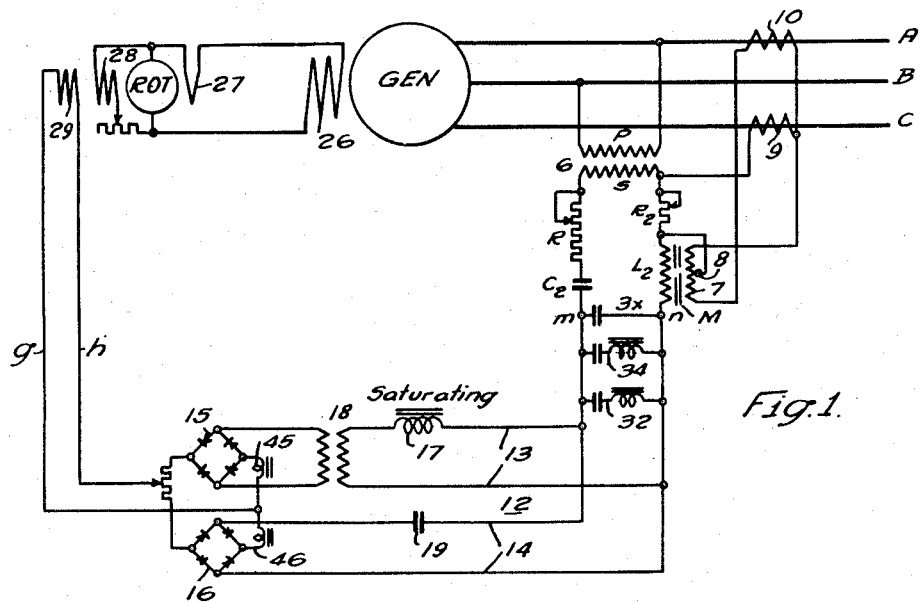
Fig. 1.
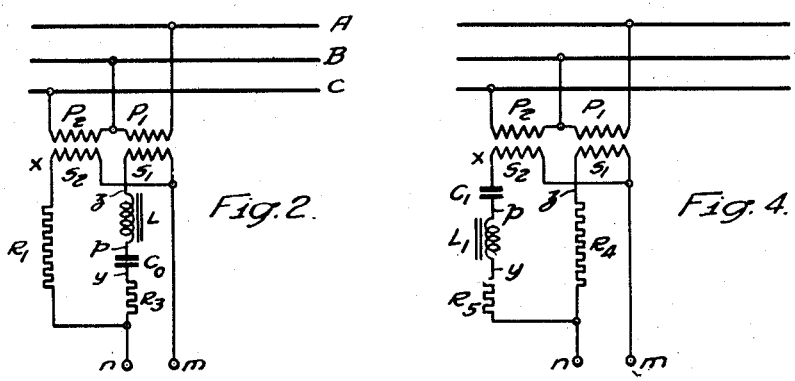
Fig. 2.   Fig. 4.
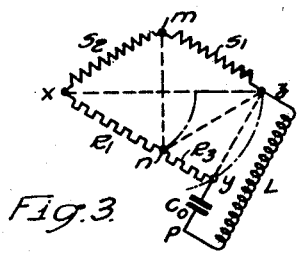   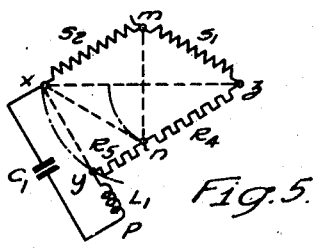
Fig. 3.   Fig. 5.
WITNESSES:
INVENTORS
Edwin L. Harder and
Homer M. Rustebakke.
BY
ATTORNEY Patented Sept. 20, 1949

2,482,482

UNITED STATES PATENT OFFICE 2,482,482

CONTROL SYSTEM

Edwin L. Harder and Homer M. Rustebakke, Pittsburgh, Pa., assignors to Westinghouse Electric Corporation, East Pittsburgh, Pa., a corporation of Pennsylvania Application February 1, 1946, Serial No. 644,804

17 Claims. (Cl. 322—20)

Our invention relates to a new kind of phase-sequence-responsive voltage-regulating means, which has several distinctive novel features. Our invention was primarily designed for use in connection with a polyphase generator which is required to produce a reliable constant voltage, with a minimum of apparatus, in a situation in which the vibration and jarring of the foundation ruled out vacuum tubes and vibrating regulators; but various features of our invention are of general utility in other situations in which the vibration troubles are non-existent.

In an application of E. L. Harder, Serial No. 560,299, filed October 25, 1944, patented August 19, 1947, Number 2,426,018, there is shown a compensated type of positive-sequence voltage-deriving apparatus, for supplying a single-phase voltage to a static voltage-reference network of the intersecting-impedance type, which is utilized in combination with rectifiers, for providing a unidirectional current, which flows in one direction or the other, to control a rotating amplifier which is utilized in the excitation of the polyphase generator. Such a voltage-reference network necessarily includes one or more distorted-wave impedance-devices, or devices which draw a non-sinusoidal current when impressed with a sinusoidal voltage. Positive phase-sequence regulator-controlling voltage was utilized, rather than one of the phases of the polyphase generator-voltage, in order to obtain a regulating voltage which would always decrease, in the event of a fault on the output-leads of the generator. This was necessary, because a single-phase fault, on a polyphase generator, sometimes causes the voltage to momentarily rise, on one of the unfaulted phases of the generator, thus making it undesirable to utilize a single-phase regulator which is controlled from a single phase of the generator-voltage. A polyphase voltage-responsive rectifier could not be utilized, to obtain a response to the average generator-voltage, rather than the positive-sequence generator-voltage, because of the fact that the voltage-reference network required an alternating-current energization.

The problems which have just been discussed, and some of their solutions, are also shown in a paper by E. L. Harder and C. E. Valentine in the Transactions section of the Electrical Engineering for August, 1945, pages 601–606.

An object of our present invention is to provide a frequency-responsive combination, for the voltage-regulating apparatus which has just been described, and for other similar apparatus, where- by the output of a static positive-sequence voltage-deriving network, or the input into a static voltage-reference network of a voltage-regulating system, may be non-linearly distorted by a change in the frequency of the generator, over a predetermined frequency-range. The need for this, resulted from the fact that the voltage-reference network was of a type which regulated for a lower voltage, in response to a decrease in the generator-frequency, and this had to be compensated for by making the derived regulating-voltage drop off faster than linearly, in response to a decrease in the generator-frequency.

A further object of our invention is to provide a filter-means, which is connected across the output-terminals of the phase-sequence network, or across the input-terminals of the voltage-reference network, for permitting harmonics to flow in the voltage-reference network or other load-device, substantially without flowing in the phase-sequence network or other supply-device. This was found to be necessary, in order to make the inductive and capacitive reactive impedances of the phase-sequence network, or other supply-device, operate with the requisite approximately sinusoidal wave-form, notwithstanding the fact that the non-linear impedance-characteristics and the rectifying means of the voltage-reference network caused a highly distorted wave-form in the currents traversing said network. A previous attempt to compensate for frequency-changes neglected to make such a provision for harmonics in the voltage-reference network but not in the voltage-deriving network, as shown in Figs. 3 and 5 of the Schmutz Patent 2,217,457, granted October 8, 1940.

With the foregoing and other objects in view, our invention consists in the circuits, combinations, systems, methods, apparatus and parts, hereinafter described and claimed, and illustrated in the accompanying drawing, wherein:

Figure 1 is a diagrammatic view of apparatus illustrating our invention in a preferred form of embodiment.

Fig. 2 is a diagrammatic view of a different form of frequency-responsive positive-sequence voltage-network, which might be utilized in place of the voltage-sequence network of Fig. 1.

Fig. 3 is a diagrammatic view indicative of the vector-relations of the apparatus shown in Fig. 2, and Figs. 4 and 5 are views, similar to Figs. 2 and 3, respectively, showing a modified form of apparatus in which the output-voltage of the phase-sequence network increases, rather than decreases, in response to a decrease in the line-frequency.

In Fig. 1, we have shown a 3-phase power-system or line, marked A, B, C, the voltage of which is to be regulated. We have shown, in Fig. 1, a modification of the particular form of current-compensated voltage-regulator which is shown and described in the aforesaid Harder application, and which utilizes a single single-phase potential-transformer 6, having a primary winding P and a secondary winding S, the primary winding being energized from the A—B phase of the system-voltage. Connected in series with the secondary winding S is a compensator-impedance, comprising a resistance $R_2$ and an inductance $L_2$ which correspond to the negative-sequence system-impedance, and these compensator-impedances are traversed by line-currents in such manner as to develop a voltage-drop equal to the negative-sequence voltage-component of the system, as set forth in the Harder application. In the particular form of embodiment shown in Fig. 1, the inductive reactance $L_2$ is the secondary winding of a mutual reactance M, which has a primary winding 7, having a midpoint tap 8. The phase-C system-current is circulated through the resistor $R_2$ and through one-half of the primary winding 7, by means of a line-current transformer 9, while the phase-A system-current is supplied to the other half of the winding 7, by means of a line-current transformer 10.

As shown in Fig. 1, a voltage-adjusting rheostat R is also connected in series with the secondary winding S of the potential transformer 6.

The potential-transformer secondary S, with its serially-connected compensator-impedances $R_2$ and $L_2$, and the serially-connected voltage-adjusting rheostat R, constitute a positive-sequence voltage-deriving static network, because the delta system-voltage, one of which appears across the line-conductors A and B, is equal to the positive-sequence system-voltage plus the negative-sequence system-voltage, and the negative-sequence component is subtracted by the compensator-impedances $R_2$ and $L_2$, which are traversed by line-currents of the proper magnitudes and phases. In a general sense, this phase-sequence network is representative of any static phase-sequence-responsive network, having a plurality of impedance components having a plurality of diverse phase-angle characteristics, for deriving a single-phase voltage from the polyphase power-system A, B, C, and supplying said voltage to the network-terminals $m$, $n$. Another form of such a network is shown in Fig. 2, which will subsequently be described.

In accordance with our present invention, a capacitor $C_2$ is also associated with the output-circuit of the positive-sequence derived-voltage network, for the purpose of providing, in combination with the inductive reactive impedance of the network, an overall impedance-drop which varies in a required non-linear manner, in response to variations in the system-frequency, as will subsequently be described. This capacitor $C_2$ is illustrated in Fig. 1 as being connected in series with the secondary winding S of the potential-transformer 6, so that it is in series with the inductive reactance $L_2$ and with the reactive part of the secondary-winding impedance, but since it is well known that the resultant-impedance effects of serially-connected capacitive and inductive reactances can be matched by parallel-connected inductive and capacitive reactances, and vice versa, it is to be understood that the particular showing, in Fig. 1, as well as in the subsequently described figures, is intended to be symbolic or representative of any combination of inductive and capacitive reactive impedances which are only partially tuned, or of unequal magnitudes, as will be subsequently described.

The output-terminals of the frequency-responsive positive-sequence voltage-deriving network are marked $m$ and $n$, in Fig. 1, and these terminals are utilized to supply a single-phase regulating-voltage to a load-device in the form of a static voltage-reference network, which is indicated, in its entirety, at 12. This is a known form of network, of the balanced-voltage, intersecting-impedance type, having two internal circuits 13 and 14, terminating in rectifier-bridges 15 and 16, respectively. It is well-known that rectifiers are non-linear (or distorted-wave) devices which produce unidirectional (and hence non-sinusoidal) currents. The direct-current output-circuits of these bridges are connected so as to provide an output-circuit $g$—$h$, having therein a current which is zero when the system-voltage is at a desired predetermined value, and having therein a direct-current which varies, in sign and magnitude, in response to departures of the system-voltage from the predetermined norm. To this end, one of the internal circuits 13 of the voltage-reference network 12, has a non-linear (or distorted-wave) impedance, which is represented by a saturating reactance 17. It is also connected to its rectifier-bridge 15 through an insulating transformer 18. The other internal circuit 14 of the voltage-reference network has a linear, or more linear, impedance, which may be any kind of impedance, and is represented, in Fig. 1, by a capacitor 19, which helps to improve the power factor of the combination. The voltage-reference load-device or network 12 which is served by the output-terminals $m$, $n$ of the phase-sequence network thus has distorted-wave impedances for three elements 13, 15 and 16, out of the four elements, 13, 14, 15 and 16, which make up this load-network.

The output-circuit $g$—$h$ of the voltage-reference network 12 is utilized to control a voltage-regulating means for the 3-phase power-system A, B, C. In the particular system shown in Fig. 1, this voltage-regulating means is in the form of an excitation-controlling means for a 3-phase generator GEN, having an exciting winding 26 which is excited by means of a rotating amplifier ROT. This rotating amplifier ROT is a special kind of direct-current dynamo electric machine which is operated on the linear part of its saturation-characteristic, and which is completely self-excited by shunt and series field, which are very symbolically indicated, in Fig 1, by a series field 27 and a shunt field 28 The rotating exciter ROT thus is capable of supporting itself at any voltage from zero up to the point of saturation. It has one or more control-fields 29 which, when excited, cause the generator voltage to begin to increase, or to begin to decrease, according to the direction of excitation. The generated voltage becomes constant or stable, at any desired value, when the control-field 29 is unexcited.

Our system, as shown in Fig. 1, is also provided with a filter-means which is connected across the terminals $m$—$n$, which are the output-terminals of the positive-sequence voltage-deriving network, and the input-terminals of the voltage-reference network. Any suitable type of filter-means may be utilized, for permitting harmonics to flow in the load-network but not in the supply-network. The particular filter-means shown in Fig. 1 comprise three filter-circuits, one circuit, 32, for absorbing the third harmonic, another circuit, 34, for absorbing the fifth harmonic, and a third circuit, 3x, consisting of a capacitor alone, for absorbing all higher harmonics; or the filter-circuits 32 and 34 could be tuned to any other harmonics which were found to be particularly objectionable.

In the operation of the system shown in Fig. 1, a single-phase system-frequency voltage is supplied to the output-terminals $m$—$n$ of the positive-sequence voltage-deriving network, and this voltage is applied to the voltage-reference network 12, in which the saturating reactor 17 becomes saturated, so that the reactor operates slightly above the knee of its saturation-curve at a predetermined value of the system-voltage. At this particular value of the system-voltage, the rectified voltage of the rectifier 15, which is energized in series with the saturating reactor 17, is exactly matched by the rectified voltage produced in the other rectifier 16, which is energized in the linear-impedance branch 14 of the voltage-reference network. These two rectified voltages are smoothed out by means of serially-connected choke-coils 45 and 46, respectively, or any equivalent means, and are directly compared by being connected in a series, circulating-current circuit, so that the direct-current output-voltage of the terminals $g$—$h$ is zero when the system-voltage is at the desired predetermined magnitude. The unidirectional output-current of the terminals $g$—$h$ becomes positive or negative, as the system-voltage varies above or below the predetermined norm.

The voltage-reference network 12 is afflicted inherently with a tendency to regulate for a lower voltage, as the frequency of the system drops. The reason for this is that, at a lower frequency, the saturating reactor 17 will draw a very considerably higher current, which makes it necessary for the rotating amplifier ROT to supply a considerably reduced exciting-current to the generator GEN, thus considerably reducing the system-voltage, and correspondingly reducing the regulating voltage at $m$—$n$, in order to maintain a balanced-impedance condition in the voltage-reference network 12.

The function of our frequency-compensating capacitor $C_2$, in the phase-sequence voltage-deriving network of Fig. 1, is to cause this network to produce an output-voltage, at the terminals $m$—$n$, which decreases when the system-frequency decreases, while the system-voltage remains constant. This frequency-responsive reduction in the voltage-transformation ratio of the voltage-deriving network is made to match the tendency of the voltage-reference network 12 to regulate for a lower voltage when the frequency is reduced, or for a higher voltage when the frequency is increased; or, in general, to match the input-voltage requirements of the voltage-reference network 12, in order to regulate the A. C. generator GEN for a constant voltage when its frequency is varied. Usually, this frequency-compensating response is required to be effective over only a restricted range of frequencies, such as a frequency-variation between 55 and 65 cycles, on a 60-cycle system, so that it is feasible to match the frequency-responsive characteristics of the voltage-deriving supply-network with the frequency-responsive characteristics of the load-network 12, with sufficient accuracy for practical purposes.

Our invention is not limited, of course, to the special type of current-compensated voltage-deriving network which is shown in Fig. 1.

Thus, in Fig. 2, we have shown a different type of voltage-deriving network, which could be utilized for supplying the governing-voltage to the terminals $m$—$n$ in Fig. 1. In Fig. 2, we have shown a positive-sequence voltage-segregating network or filter which is conventional, except that one of the reactive impedances is produced by a combination of inductive and capacitive reactive impedances, so as to produce a non-linear frequency-responsive effect, causing the output-voltage, at $m$—$n$, to vary in the desired non-linear manner, in accordance with the frequency, in order to match the particular requirements of the load-device which is connected to the output-terminals $m$—$n$.

In the particular positive-sequence voltage-network shown in Fig. 2, two single-phase potential-transformers are shown, having primary windings $P_1$ and $P_2$, and secondary windings $S_1$ and $S_2$, respectively, for deriving the delta line-voltages in phases A—B and C—B, respectively, thus producing voltages which are 60° out of phase with each other, under balanced system-conditions. Connected in series with the secondary $S_2$ is an impedance $R_1$, which is illustrated as a resistance. Connected in series with the secondary $S_1$ is an impedance having the same magnitude as $R_1$, but having an impedance-angle 60° ahead of the impedance $R_1$. This second impedance has a resistance and an inductive reactance, but instead of having a simple inductive reactance, as is ordinary, it has a somewhat-larger-than-usual inductive reactance $L$, to which is serially connected a smaller capacitive reactive impedance $C_0$, so that the combined effect of $L$ and $C_0$ is an inductive reactive impedance, which is combined with a serially-connected resistor $R_3$, making up the 60° impedance which is connected in series with the secondary winding $S_1$. One terminal of each of the secondary windings $S_1$ and $S_2$ is connected to the output-terminal $m$ of the network. The other terminal $x$ of the winding $S_2$ is connected to the output-terminal $n$ through the resistor $R_1$. The other terminal $z$ of the winding $S_1$ is connected to the last-mentioned network-terminal $n$ through a circuit including the inductive reactive impedance $L$, a conductor $p$, the capacitor $C_0$, a conductor $y$, and the resistor $R_3$.

Fig. 3 shows the vectorial relations of the voltages produced by the network shown in Fig. 2. If there should be a reduction in the applied frequency, the impedance of the inductance $L$ would decrease proportionally to the frequency, while the impedance of the capacitor $C_0$ would increase, being inversely proportional to the frequency, thus still further reducing the length of the leg $yz$ of the right-angle triangle $xyz$ which is built upon the fixed hypotenuse $xz$, thus causing the point $y$ to move anticlockwise around the circle built on the diameter $xy$. Since the point $n$ is on a potentiometer between $x$ and $y$, it also moves on a smaller circle, and it can be seen that this motion is in a direction to decrease the voltage between $m$ and $n$. The amount of motion, for a given change in frequency, can be adjusted by adjusting the relative lengths $zp$ and $yp$, holding the distance $zy$ constant, at the normal frequency.

Fig. 4, and the explanatory vector-diagram in Fig. 5, show a modification of the apparatus shown in Fig. 2, in which it is assumed that the positive-sequence voltage-segregating network is utilized with a load (not shown) in which it is required that the output-voltage at $m$—$n$ should increase, when the frequency decreases. In this case, the impedance having a phase-angle 60° behind the other, is a resistance $R_4$, and the impedance having a lagging phase-angle is made up of a capacitive reactive impedance $C_1$, a smaller inductive reactive impedance $L_1$, and a resistor $R_5$, producing a vector diagram as shown in Fig. 5, from which it will be seen that an increase in the system-frequency will move the point $y$ clockwise, thus again producing a reduction in the output-voltage $mn$, which was produced, in Fig. 3 by an assumed decrease in frequency.

While we have illustrated our invention in three illustrative forms of embodiment, and while we have explained the theory of our invention in accordance with our present understanding, we wish it to be understood that we are not limited to the particular illustrative diagrams or to the particular theories which have been stated. We desire, therefore, that the appended claims shall be accorded the broadest interpretation consistent with their language.

We claim as our invention:

1. In combination: an alternating-current power-system; a voltage-regulating means therefor; voltage-deriving means for deriving a single-phase regulating-voltage from said power-system; a voltage-reference device having input and output terminals, and having the property of responding to departures of its input-voltage from a predetermined norm, said predetermined norm inherently varying in response to frequency, in the event of a variation in the input-frequency, said voltage-reference device requiring, in its operation, the flow of various harmonics; means for controlling the voltage-regulating means in response to the output terminals of said voltage-reference device; means for energizing the input terminals of said voltage-reference device from the regulating-voltage produced by said voltage-deriving means; a partially tuned circuit, including unequal capacitive and inductive reactive impedances, associated with said voltage-deriving means in such relative magnitudes as to cause the proportionality between the system-voltage and the derived regulating-voltage to vary in substantially the same manner as said inherent norm-variation, in response to a predetermined range of variations in the system-frequency; and filter-means, connected across the input terminals of said voltage-reference device, for permitting harmonics to flow in said voltage-reference device substantially without flowing in said voltage-deriving means or in said partially tuned circuit.

2. In combination: an alternating-current power-system; a responsive device adapted to be energized therefrom and having a predetermined selective response when the system-voltage is at a predetermined norm, the predetermined norm at which said response is obtained inherently varying in response to the system-frequency in the event of frequency-variation, said responsive device requiring, in its operation, the flow of various harmonics; connecting-means for connecting said responsive device to the power-system, said connecting-means including a partially tuned circuit, including unequal capacitive and inductive reactive impedances, in such relative magnitudes as to cause the proportionality between the system-voltage and the effective voltage applied to said responsive device to vary in substantially the same manner as said inherent norm-variation, in response to a predetermined range of variations in the system-frequency; and filter-means, connected across the input terminals of said responsive device, for permitting harmonics to flow in said responsive device substantially without flowing in said connecting-means.

3. In combination: a polyphase power-system; a voltage-regulating means therefor: a static phase-sequence network for deriving, from said power-system, a single-phase regulating-voltage having a predetermined phase-sequence response to the electrical conditions of said power-systems; a voltage-reference device having input and output terminals, and having the property of responding to departures of its input-voltage from a predetermined norm, said predetermined norm inherently varying in response to frequency, in the event of a variation in the input-frequency, said voltage-reference device requiring, in its operation, the flow of various harmonics; means for controlling the voltage-regulating means in response to the output terminals of said voltage-reference device; means for energizing the input terminals of said voltage-reference device from the regulating-voltage produced by said phase-sequence network; a partially tuned circuit, including unequal capacitive and inductive reactive impedances, associated with said phase-sequence network in such circuit-connection as to make the phase-sequence response vary in response to frequency, and in such relative magnitudes as to cause the proportionality between the system-voltage and the derived regulating-voltage to vary in substantially the same manner as said inherent norm-variation, in response to a predetermined range of variations in the system-frequency; and filter-means, connected across the input terminals of said voltage-reference device, for permitting harmonics to flow in said voltage-reference device substantially without flowing in said phase-sequence network or in said partially tuned circuit.

4. In combination: a polyphase power-system; a responsive device adapted to be energized therefrom and having a predetermined selective response when the system-voltage is at a predetermined norm, the predetermined norm at which said response is obtained inherently varying in response to the system-frequency in the event of frequency-variation, said responsive device requiring, in its operation, the flow of various harmonics; a static phase-sequence network for connecting said responsive device to the power-system, said phase-sequence network deriving, from said power-system, a single-phase regulating-voltage having a predetermined phase-sequence response to the electrical conditions of said power-system, and said phase-sequence network including a partially tuned circuit, including unequal capacitive and inductive reactive impedances, in such circuit-connection as to make the phase-sequence response vary in response to frequency, and in such relative magnitude as to cause the proportionality between the system-voltage and the effective voltage applied to said responsive device to vary in substantially the same manner as said inherent norm-variation, in response to a predetermined range of variations in the system-frequency; and filter-means, connected across the input terminals of said responsive device, for permitting harmonics to flow in said responsive device substantially without flowing in said phase-sequence network.

5. In combination: an alternating-current power-system; a voltage-regulating means therefor; voltage-deriving means for deriving a single-phase regulating-voltage from said power-system; a static balanced-voltage voltage-reference network having input and output terminals, and having two internal circuits having intersecting impedance-characteristics, at least one of said internal circuits including a non-linear impedance, whereby said voltage-reference network has the property of responding to departures of its input-voltage from a predetermined norm, said predetermined norm inherently varying in response to frequency, in the event of a variation in the input-frequency; means for controlling the voltage-regulating means in response to the output terminals of said voltage-reference network; means for energizing the input-terminals of said voltage-reference network from the regulating-voltage produced by said voltage-deriving means; a partially tuned circuit, including unequal capacitive and inductive reactive impedances, associated with said voltage-deriving means in such relative magnitudes as to cause the proportionality between the system-voltage and the derived regulating-voltage to vary in substantially the same manner as said inherent norm-variation, in response to a predetermined range of variations in the system-frequency; and filter-means, connected across the input terminals of said voltage-reference network, for permitting harmonics to flow in said non-linear impedance substantially without flowing in said voltage-deriving means or in said partially tuned circuit.

6. In combination: an alternating-current power-system; a static balanced-voltage voltage-reference network adapted to be energized therefrom and having two internal circuits having intersecting impedance-characteristics, at least one of said internal circuits including a non-linear impedance, whereby said voltage-reference network has a predetermined selective response when the system-voltage is at a predetermined norm, the predetermined norm at which said response is obtained inherently varying in response to the system-frequency in the event of frequency-variation; connecting-means for connecting said voltage-reference network to the power-system, said connecting-means including a partially tuned circuit, including unequal capacitive and inductive reactive impedances, in such relative magnitudes as to cause the proportionality between the system-voltage and the effective voltage applied to said voltage-reference network to vary in substantially the same manner as said inherent norm-variation, in response to a predetermined range of variations in the system-frequency; and filter-means, connected across the input terminals of said voltage-reference network, for permitting harmonics to flow in said non-linear impedance substantially without flowing in said connecting-means.

7. In combination: a polyphase power-system; a voltage-regulating means therefor; a static phase-sequence network for deriving, from said power-system, a single-phase regulating-voltage having a predetermined phase-sequence response to the electrical conditions of said power-system; a static balanced-voltage voltage-reference network having input and output terminals, and having two internal circuits having intersecting impedance-characteristics, at least one of said internal circuits including a non-linear impedance whereby said voltage-reference network has the property of responding to departures of its input-voltage from a predetermined norm, said predetermined norm inherently varying in response to frequency, in the event of a variation in the input frequency; means for controlling the voltage-regulating means in response to the output terminals of said voltage-reference network; means for energizing the input-terminals of said voltage-reference network from the regulating-voltage produced by said phase-sequence network; a partially tuned circuit, including unequal capacitive and inductive reactive impedances, associated with said phase-sequence network in such circuit-connection as to make the phase-sequence response vary in response to frequency, and in such relative magnitudes as to cause the proportionality between the system-voltage and the derived regulating-voltage to vary in substantially the same manner as said inherent norm-variation, in response to a predetermined range of variations in the system-frequency; and filter-means, connected across the input terminals of said voltage-reference network, for permitting harmonics to flow in said non-linear impedance substantially without flowing in said phase-sequence network.

8. In combination: a polyphase power-system; a static balanced-voltage voltage-reference network adapted to be energized therefrom and having two internal circuits having intersecting impedance-characteristics, at least one of said internal circuits including a non-linear impedance, whereby said voltage-reference network has a predetermined selective response when the system-voltage is at a predetermined norm, the predetermined norm at which said response is obtained inherently varying in response to the system-frequency in the event of frequency-variation; a static phase-sequence network for connecting said voltage-reference network to the power-system, said phase-sequence network deriving, from said power-system, a single-phase regulating-voltage having a predetermined phase-sequence response to the electrical conditions of said power-system, and said phase-sequence network including a partially tuned circuit, including unequal capacitive and inductive reactive impedances, in such circuit-connection as to make the phase-sequence response vary in response to frequency, and in such relative magnitudes as to cause the proportionality between the system-voltage and the effective voltage applied to said voltage-reference network to vary in substantially the same manner as said inherent norm-variation, in response to a predetermined range of variations in the system-frequency; and filter-means, connected across the input terminals of said voltage-reference network, for permitting harmonics to flow in said non-linear impedance substantially without flowing in said phase-sequence network.

9. A three-phase-system combination as defined in claim 4, characterized by said static phase-sequence network comprising a compensator-type positive-sequence voltage-deriving combination, comprising means for deriving a single phase of the system-voltage, a serially connected compensator-impedance substantially corresponding to the negative-sequence system-impedance, and means for causing system-current to traverse said compensator-impedance in such manner as to produce a compensator-voltage substantially corresponding to the negative-sequence system-voltage; and said partially tuned circuit of said positive-sequence voltage-deriving combination including the inductive reactive part of said compensator-impedance in combination with a partially tuned capacitive reactive impedance.

10. A static phase-sequence network for deriving the positive-sequence voltage from a three-phase system, comprising means for deriving a single phase of the system-voltage, a serially connected compensator-impedance substantially corresponding to the negative-sequence system-impedance, and means for causing system-current to traverse said compensator-impedance in such manner as to produce a compensator-voltage substantially corresponding to the negative-sequence system-voltage; in combination with a capacitive reactive impedance in a partial tuned-circuit relation to the inductive reactive part of said compensator-impedance, whereby the derived positive-sequence voltage is non-linearly distorted by a predetermined range of variations in the system-frequency.

11. A three-phase-system combination as defined in claim 4, characterized by said static phase-sequence network comprising a compensator-type positive-sequence voltage-deriving combination, comprising two voltage-deriving means for deriving two phases of the system-voltage, said two phases having a 60° relation under balanced conditions, two network-impedances of equal magnitude, but one having an impedance-angle 60° in advance of the other, and network-connecting means for connecting one impedance to each voltage-deriving means and for obtaining the vectorial sum of the whole, whereby the network normally responds to only the positive-sequence component of the system-voltage; and said partially tuned circuit comprising the reactive impedance part of one of said two network-impedances.

12. A static phase-sequence network for deriving a phase-sequence component of a three-phase electrical quantity of a three-phase system, comprising two quantity-deriving means for deriving two phases of said three-phase electrical quantity, said two phases having a 60° relation under balanced conditions, two network-impedances of equal magnitude, but one having an impedance-angle 60° in advance of the other, and network-connecting means for connecting one impedance to each quantity-deriving means and for obtaining the vectorial sum of the whole, whereby the network normally responds to only one phase-sequence component of said three-phase electrical quantity; the reactive impedance part of one of said two network-impedances comprising a partially tuned circuit including unequal capacitive and inductive reactive impedances in such magnitudes as to make the phase-sequence response vary in a predetermined manner, in response to a predetermined range of variations in the system-frequency.

13. A static phase-sequence network for obtaining a predetermined phase-sequence response in a three-phase system, comprising a plurality of quantity-deriving means for deriving a plurality of diverse single-phase relaying quantities from diverse phases of said system, a plurality of network-impedances at least some of which includes reactive impedance, and network-connecting means for energizing the several network-impedances from said plurality of quantity-deriving means and for obtaining the vectorial sum of the whole in such manner as to obtain the predetermined phase-sequence response, the reactive impedance part of at least one of said network-impedances comprising a partially tuned circuit including unequal capacitive and inductive reactive impedances in such magnitudes as to make the phase-sequence response vary in a predetermined manner, in response to a predetermined range of variations in the system-frequency.

14. In combination: a polyphase power-system; a distorted-wave load-device adapted to be energized therefrom, said load-device including one or more devices which draw a non-sinusoidal current when impressed with a sinusoidal voltage; a static phase-sequence-responsive network for connecting said load-device to the power-system, said static network including a plurality of impedance components having a plurality of diverse phase-angle characteristics; and filter-means, connected across the output-terminals of the phase-sequence network, for permitting harmonics to flow in said load device substantially without flowing in said phase-sequence network.

15. In combination: an alternating-current power-system; a static balanced-voltage voltage-reference network adapted to be energized therefrom and having two internal circuits having intersecting impedance-characteristics, at least one of said internal circuits including a non-linear impedance, whereby said voltage-reference network has non-sinusoidal impedance-characteristics; connecting-means for connecting said voltage-reference network to the power-system; and filter-means, connected across the input-terminals of the voltage-reference network, for permitting harmonics to flow in said voltage-reference network substantially without flowing in the connecting-means.

16. In combination: a polyphase power-system; a static balanced-voltage voltage-reference network adapted to be energized therefrom and having two internal circuits having intersecting impedance-characteristics, at least one of said internal circuits including a non-linear impedance, whereby said voltage-reference network has non-sinusoidal impedance-characteristics; a static phase-sequence-responsive network for connecting said voltage-reference network to the power-system; and filter-means, connected across the input-terminals of the voltage-reference network, for permitting harmonics to flow in said voltage-reference network substantially without flowing in the phase-sequence network.

17. The invention as defined in claim 16, characterized by said voltage-reference network having rectifier-means fed from its two internal circuits.

EDWIN L. HARDER.
HOMER M. RUSTEBAKKE.

REFERENCES CITED

The following references are of record in the file of this patent:

FOREIGN PATENTS

| Number | Country | Date |
|---|---|---|
| 834,163 | France | Aug. 8, 1938 |